Jan. 31, 1950     H. T. WHITE ET AL     2,495,796
CLAMPING RING

Filed Aug. 20, 1945

INVENTORS.
LOUIS R. DiFILIPPO
HERMAN FRITSCH
BY HOWARD T. WHITE

ATTORNEY.

Patented Jan. 31, 1950

2,495,796

UNITED STATES PATENT OFFICE 2,495,796

CLAMPING RING

Howard Theodore White, West Collingswood, N. J., and Herman Fritsch, Philadelphia, and Louis R. Di Filippo, Newton Square, Pa.

Application August 20, 1945, Serial No. 611,667

2 Claims. (Cl. 29—205)

(Granted under the act of March 3, 1883, as amended April 30, 1928; 370 O. G. 757)

This invention relates to the assembling of large commutators, the main difficulty of which is the holding of the separate segments securely and accurately while they are seated.

The old method consisted of using large forged rings. Each ring had a multiplicity of screws each of which had to be tightened in order to align the segments properly. This was a slow process and was further complicated by the fact that if excessive pressure was put on any one screw, it would cause misalignment of the commutator.

An object of this invention is to cut down on the required time for the assembly of the commutator segments.

A further object is to supply a tool for the assembly of commutators with a minimum of danger of misalignment.

Figure 1:
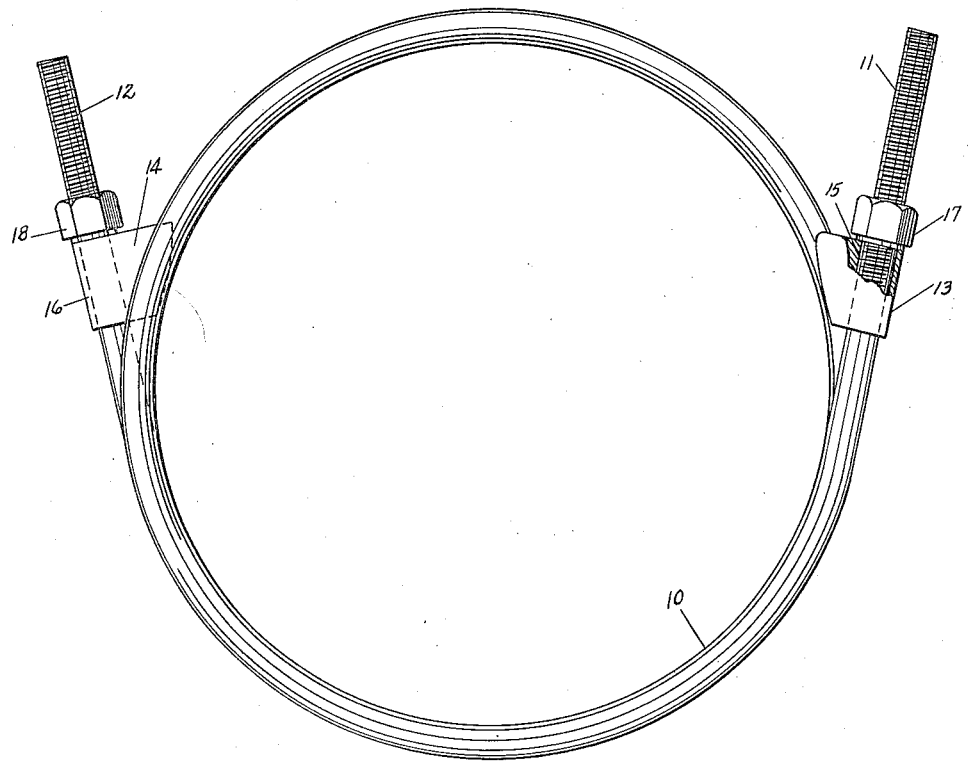
Figure 2:
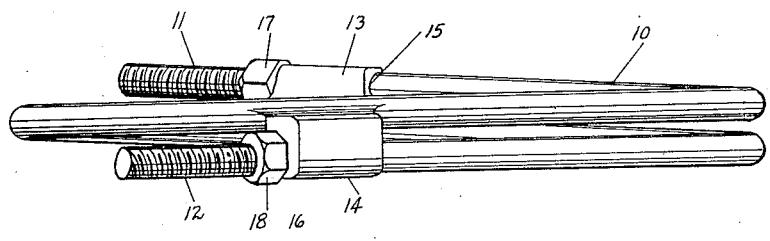

Further objects and advantages of this invention, as well as its construction, arrangement and operation, will be apparent from the following description and claims in connection with the accompanying drawing, in which Fig. 1 shows a plan view of the tool; and Fig. 2 shows a side view of the tool.

The circular clamping portion 10 of the tool is, preferably, metal rod stock, formed to a cylindrical helix or circular loop having ends 11—12 extending tangentially from the circle defined. Lugs 13—14 are secured, as by welding, to the circular portion 10. These lugs have holes 15—16 provided for receiving the tangentially extending ends 11—12. Said ends 11—12 can be drawn through lugs 13—14 by any adjustable means such as threading said ends 11—12 and supplying them with nuts 17—18 to bear on lugs 13—14. This makes the circular or clamping portion 10 contractable.

In operation two of these tools are normally used. One is placed over each end of the assembled commutator and tightened.

Heat is then applied and the pressure on the segments increased by further tightening of the nuts 17—18. This forces out all excess shellac and seats each segment equally and firmly. The tools are retained in position until after the commutator is installed on the armature.

Various modifications and changes can be made in the subject device without departing from the scope of the invention.

The invention described herein may be manufactured and used by or for the Government of the United States of America for governmental purposes without the payment of any royalties thereon or therefor.

We claim:

1. A commutator segment assembling tool consisting of a rod defining a circle and having overlapping ends, and lugs attached to the rod substantially across the circle from each other, said lugs having openings therethrough to pass the ends of the rod, said ends being threaded to receive nuts that bear upon the lugs.

2. A clamping ring comprising a unitary rod defining a helix of more than one revolution and having threaded ends extending tangentially from said helix, a plurality of lugs spaced crossways of said helix and welded to said helix, said lugs carrying said ends slidably, and nuts carried on said threaded ends and adapted to bear against said lugs.

HOWARD THEODORE WHITE.
HERMAN FRITSCH.
LOUIS R. DI FILIPPO.

REFERENCES CITED

The following references are of record in the file of this patent:

UNITED STATES PATENTS

| Number | Name | Date |
|---|---|---|
| 231,100 | Richardson | Aug. 10, 1880 |
| 702,024 | P. B. Moore | June 10, 1902 |
| 720,296 | Straub | Feb. 10, 1903 |
| 1,118,213 | G. A. Moore | Nov. 24, 1914 |
| 1,206,484 | Swan | Nov. 28, 1916 |
| 1,270,960 | Linton | July 2, 1918 |
| 1,514,412 | Wilkinson | Nov. 4, 1924 |
| 1,748,602 | Hart | Feb. 25, 1930 |
| 2,326,583 | Van Cott et al. | Aug. 10, 1943 |

FOREIGN PATENTS

| Number | Country | Date |
|---|---|---|
| 128,273 | Switzerland | Oct. 16, 1928 |